US009082208B2

(12) United States Patent
Gabel et al.

(10) Patent No.: US 9,082,208 B2
(45) Date of Patent: Jul. 14, 2015

(54) SYSTEM AND METHOD FOR LOCATING AND DISPLAYING AIRCRAFT INFORMATION

(75) Inventors: Bruce E. Gabel, Wichita, KS (US); Donald J. Hinson, Wichita, KS (US); Adam Cade Wilcox, Derby, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 451 days.

(21) Appl. No.: 13/473,828

(22) Filed: May 17, 2012

(65) Prior Publication Data

US 2013/0016184 A1    Jan. 17, 2013

Related U.S. Application Data

(60) Provisional application No. 61/506,975, filed on Jul. 12, 2011.

(51) Int. Cl.
*H04N 13/02* (2006.01)
*G06T 19/00* (2011.01)
*H04N 5/33* (2006.01)

(52) U.S. Cl.
CPC . *G06T 19/00* (2013.01); *H04N 5/33* (2013.01)

(58) Field of Classification Search
CPC .......... H04N 13/0239; H04N 13/0055; H04N 13/0296; H04N 13/0497; H04N 13/0242; H04N 13/00; H04N 13/0022; H04N 13/0207; H04N 5/33; G02B 23/2415; G06T 19/00
USPC .......................................................... 348/46
See application file for complete search history.

(56) References Cited

U.S. PATENT DOCUMENTS

| 7,787,981 B2 | 8/2010 | Austin et al. |
| 2002/0017989 A1* | 2/2002 | Forster et al. ................. 340/540 |
| 2002/0040601 A1* | 4/2002 | Fyfe et al. ....................... 73/490 |
| 2002/0044104 A1 | 4/2002 | Friedrich et al. |
| 2003/0033041 A1* | 2/2003 | Richey ............................. 700/98 |
| 2003/0093187 A1* | 5/2003 | Walker ............................... 701/1 |
| 2004/0106404 A1* | 6/2004 | Gould et al. .................. 455/431 |
| 2004/0108378 A1* | 6/2004 | Gatz ............................. 235/385 |
| 2004/0148088 A1* | 7/2004 | Davis et al. ................... 701/123 |
| 2005/0041286 A1* | 2/2005 | White ............................ 359/452 |

(Continued)

OTHER PUBLICATIONS

Maeda et al, Tracking of User Position and Orientation by Stereo Measurement of Infrared Markers and Orientation Sensing, 2004.*

(Continued)

*Primary Examiner* — Shan Elahi
(74) *Attorney, Agent, or Firm* — Hovey Williams LLP

(57) ABSTRACT

A system and method for locating and displaying aircraft information, such as three-dimensional models and various information about an aircraft component. The system may include a portable display, a remote processor, and one or more location and/or orientation-determining components. The models and other various information displayed on the portable display may correspond with a location and orientation of the portable display relative to the aircraft component. The location and/or orientation-determining components may include one or more infrared cameras for communicating with the remote processor and a plurality of infrared targets or infrared markers. The remote processor may be configured to filter the information provided to the portable display based on the portable display's location and orientation relative to the aircraft component, geographic location, user input, or other various parameters.

10 Claims, 3 Drawing Sheets

(56) References Cited

U.S. PATENT DOCUMENTS

| | | | |
|---|---|---|---|
| 2005/0055239 A1* | 3/2005 | Farmer | 705/1 |
| 2005/0102063 A1 | 5/2005 | Bierre | |
| 2007/0113690 A1* | 5/2007 | Wilcox et al. | 73/865.9 |
| 2007/0124223 A1* | 5/2007 | Avery et al. | 705/29 |
| 2007/0156496 A1* | 7/2007 | Avery et al. | 705/8 |
| 2007/0241908 A1* | 10/2007 | Coop | 340/572.8 |
| 2007/0279414 A1* | 12/2007 | Vandenbrande et al. | 345/420 |
| 2007/0282564 A1 | 12/2007 | Sprague et al. | |
| 2008/0092070 A1* | 4/2008 | Unsworth et al. | 715/764 |
| 2008/0111074 A1* | 5/2008 | Weir et al. | 250/338.1 |
| 2008/0247636 A1* | 10/2008 | Davis et al. | 382/152 |
| 2009/0046140 A1 | 2/2009 | Lashmet et al. | |
| 2009/0086014 A1* | 4/2009 | Lea et al. | 348/25 |
| 2009/0128557 A1* | 5/2009 | Finlayson et al. | 345/420 |
| 2009/0210083 A1* | 8/2009 | English et al. | 700/109 |
| 2009/0307000 A1* | 12/2009 | Scheid et al. | 705/1 |
| 2010/0042445 A1* | 2/2010 | Nicosia | 705/7 |
| 2011/0010007 A1* | 1/2011 | Sarh et al. | 700/248 |
| 2011/0087463 A1* | 4/2011 | Nakhle et al. | 703/1 |
| 2011/0155397 A1* | 6/2011 | Icove et al. | 169/43 |
| 2011/0169924 A1* | 7/2011 | Haisty et al. | 348/51 |
| 2011/0295427 A1* | 12/2011 | Motzer et al. | 700/258 |
| 2012/0304105 A1* | 11/2012 | Rosman LaFever et al. | 715/781 |

OTHER PUBLICATIONS http://www.google.com/mobile/skymap, Nov. 1, 2011.

Nicolai, et al., "Case Study of Wearable Computing for Aircraft Maintenance," Universitat Bremen, Germany, Mar. 17-18, 2005.

Behzdan, Amir H., "ARVISCOPE, Georeferenced Visualization of Dynamic Construction Processes in Three-Dimensional Outdoor Augmented Reality," University of Michigan, 2008.

Lodha, et al., "Consistant Visualization and Querying of GIS Databases by a Location-Aware Mobile Agent," University of California, Santa Cruz, CA, 2003.

Haala, Norbert, "Automated image orientation in a location aware environment," University of Stuttgart, 2001.

Haala et al., "Processing of 3D Building Models for Location Aware Applications," University of Stuttgart, 2002.

Lee et al., "A 3D data model and topological analysis for emergency response in urban areas," University of North Carolina, Charlotte, NC, Feb. 7, 2008.

Hakkarainen et al., "Mobile Augmented Reality for Building and Construction," VTT Technical Research Centre of Finland, 2010.

* cited by examiner

SYSTEM AND METHOD FOR LOCATING AND DISPLAYING AIRCRAFT INFORMATION

RELATED APPLICATIONS

The present application claims priority benefit, with regard to all common subject matter, to an earlier-filed U.S. provisional patent application titled "SYSTEM AND METHOD FOR LOCATING AND DISPLAYING AIRCRAFT INFORMATION," Ser. No. 61/506,975, filed Jul. 12, 2011, hereby incorporated by reference in its entirety into the present application.

BACKGROUND

Most aircraft design and repair has historically been based on two-dimensional drawings. However, in recent years, three-dimensional (3D) model based definition (MBD) has become more prevalent in aircraft design. In many 3D MBD programs, computer-aided design (CAD) terminals or lightweight 3D viewer terminals are installed in the factory at each workstation. While working on and/or inspecting an airplane component or structure, a mechanic or inspector must walk from the airplane to reference the CAD data on fixed workstations. Once at the terminal, the mechanic or inspector must pan, zoom, and/or rotate a displayed 3D model with software commands via a keyboard or mouse to view various areas of interest. Besides the CAD data, the mechanics must also reference multiple process specification documents, often stored in PDF documents. This typically requires manual lookup of critical information for assembly, inspection, or maintenance operations. This process of walking back and forth from the work site, adjusting 3D model views, and looking up and/or cross-referencing multiple documents is inefficient and may be error-prone, since the mechanic or inspector must remember what was just viewed at the fixed workstation once he or she returns to the work site.

Therefore, there is a need for an improved system and method for viewing information about aircraft manufacture and repair that overcomes the limitations of the prior art.

SUMMARY

Embodiments of the present invention solve the above-mentioned problems and provide a distinct advance in the art of aircraft manufacturing, inspection, and repair by providing a system for displaying location or orientation-dependent images and information about an aircraft component on a portable display. The system may comprise the portable display, at least one location and/or orientation-determining component, and a remote processor communicably coupled with the portable display and the location and/or orientation-determining component. The location and/or orientation-determining component may be configured to output information to the remote processor corresponding with a location and/or orientation of the portable display relative to the aircraft component. The remote processor may be configured to update information sent from the remote processor to the portable display based on the location and/or orientation of the portable display relative to the aircraft component.

In another embodiment of the invention, the system may be configured to display location and orientation-dependent 3-dimensional model views, images, and information about an aircraft component, and may comprise a portable display, at least one location and/or orientation-determining component, and a remote processor communicably coupled with the portable display and the location and/or orientation-determining component. The portable display may have a plurality of infrared markers, radio frequency emitters, or laser emitters fixed thereto. The location and/or orientation-determining component may be configured to output information to the remote processor corresponding with a location and/or orientation of the portable display relative to the aircraft component. Furthermore, the location and/or orientation-determining component may comprise an infrared camera, a radio frequency receiver, and/or a laser receiver configured to track locations of the plurality of infrared markers, radio frequency emitters, or laser emitters. The remote processor may be configured to receive signals output by the location and/or orientation-determining component and to send signals to the portable display based on the location and orientation of the portable display relative to the aircraft component. The signals sent from the remote processor to the portable display may comprise images to be displayed on the portable display. The images may be views of a three-dimensional model of the aircraft component rotated, zoomed, and panned by the remote processor based on the location and orientation of the portable display relative to a coordinate origin associated with a known point on the aircraft component.

Another embodiment of the present invention includes a method for sending location and orientation-based image views and information about an aircraft component to a portable display. The method may comprise the steps of receiving signals, with a remote processor, indicative of a location and orientation of the portable display from an infrared camera or cameras, then determining a location and orientation of the portable display relative to a coordinate origin based on the signals received by the remote processor. The remote processor may be configured to associate the coordinate origin with a known point on the aircraft component. Furthermore, the method may comprise a step of outputting images from the remote processor to the portable display. The images may be views of a three-dimensional model of the aircraft component rotated, zoomed, and panned by the remote processor based on the location and orientation of the portable display relative to the coordinate origin.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the preferred embodiments and the accompanying drawing figures.

BRIEF DESCRIPTION OF THE DRAWING FIGURES

Embodiments of the present invention are described in detail below with reference to the attached drawing figures, wherein.

DETAILED DESCRIPTION

Figure 1:
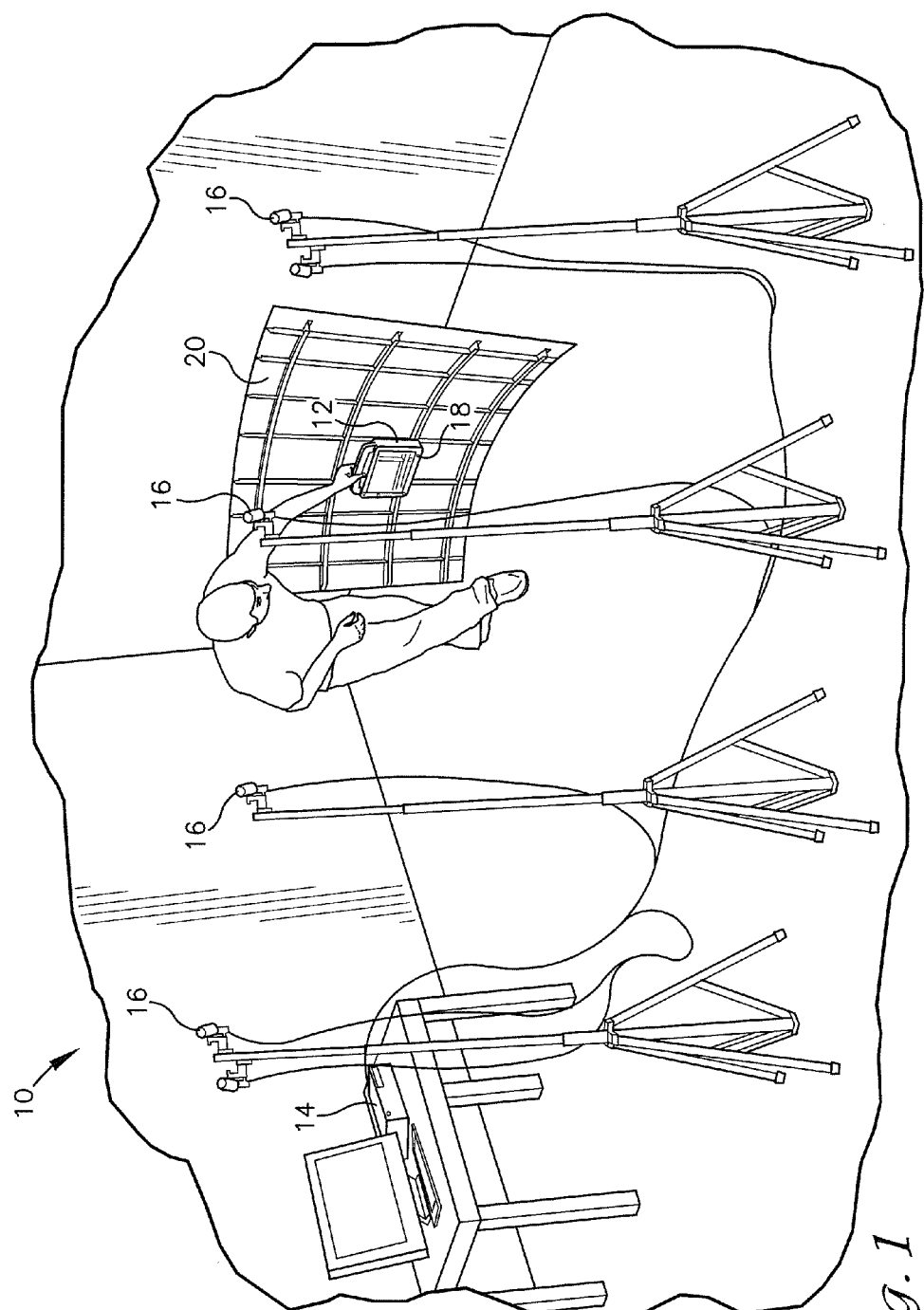
FIG. 1 is a perspective view of a system for locating and displaying aircraft information constructed in accordance with an embodiment of the present invention.

The drawing figures do not limit the present invention to the specific embodiments disclosed and described herein. The drawings are not necessarily to scale, emphasis instead being placed upon clearly illustrating the principles of the invention.

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 2:
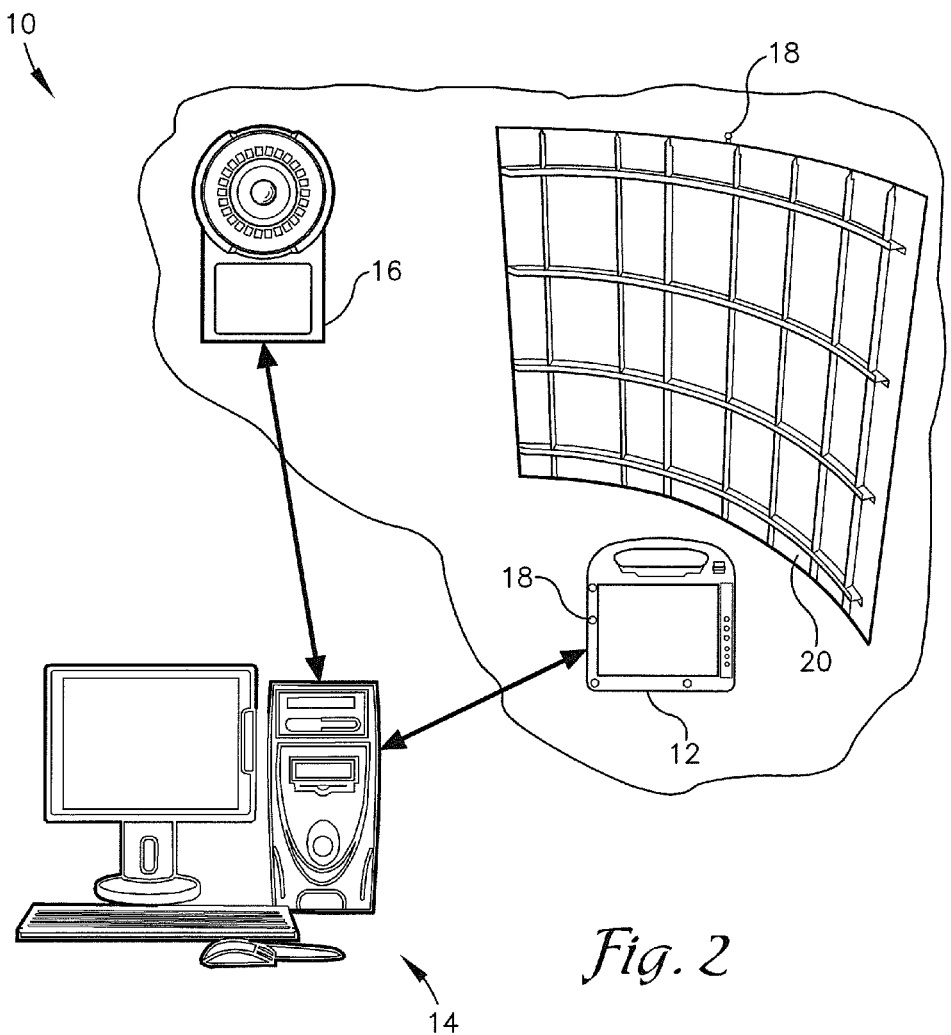
FIG. 2 is a diagram illustrating communication between components of the system of FIG. 1.
Figure 3:
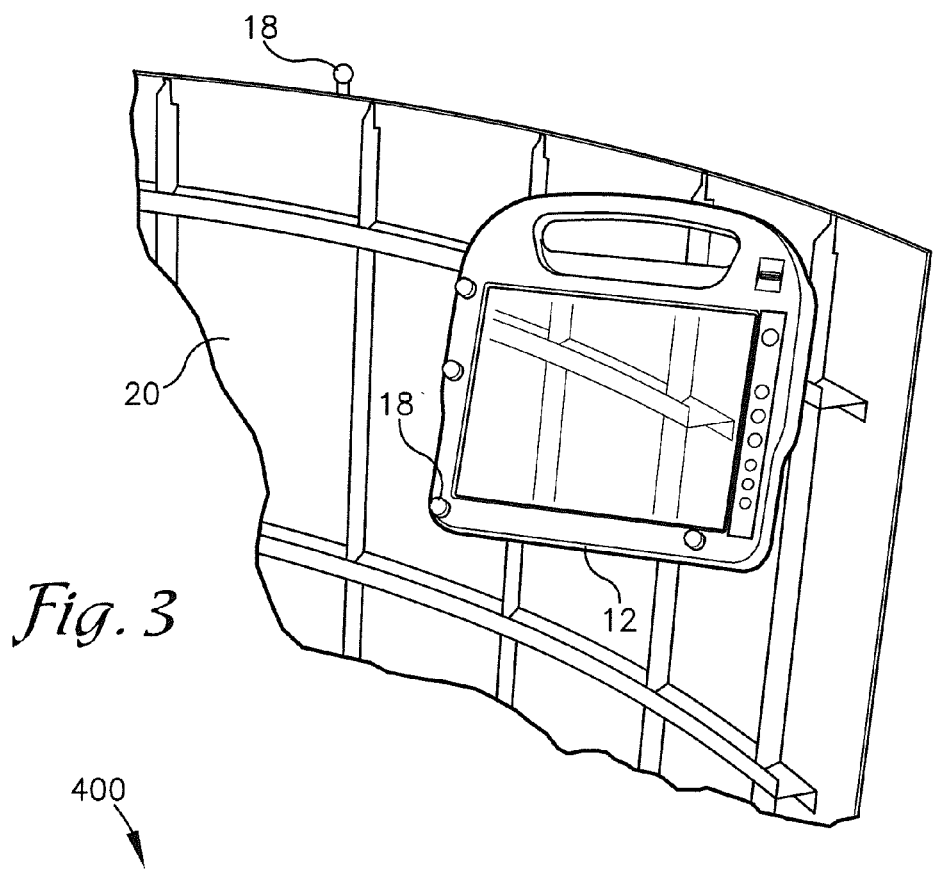
FIG. 3 is a perspective view of a portable display of the system of FIG. 1.

A system 10 for locating and displaying aircraft information, constructed in accordance with an embodiment of the present invention, is illustrated in FIGS. 1-3 and broadly comprises a portable display 12, a remote processor 14, and one or more location and/or orientation-determining components 16,18. In general, the location and/or orientation-determining components 16,18 may be configured to communicate a location and/or orientation of the portable display 12 relative to an aircraft component 20 to the remote processor 14. The remote processor 14 may transmit three-dimensional models, schematics, and other aircraft component-related information to the portable display 14 based on the location and/or orientation information sensed by the location and/or orientation-determining components 16,18.

The aircraft component 20 may include one or multiple aircraft components, such as a nacelle, a thrust reverser, a strut, a wing, a fuselage component, an aircraft engine, and/or a cockpit. The aircraft component 20 may further include multiple attachment components such as nuts and bolts, locking components, actuators, translating parts, cascade thrust reverser vanes, or any other aircraft components. In some alternative embodiments of the invention, the system 10 may be used with any other items to be inspected or constructed, such as automobile parts, boat parts, factory machines, buildings, or other various structures or vehicles.

The portable display 12 may be any substantially portable device having a display screen configured for graphically displaying images and/or data stored thereon or received by the portable display 12. For example, the portable display 12 may be a laptop, tablet (e.g., an iPad®), cellular phone, smartphone, personal digital assistant (PDA), or other portable computing devices configured to communicate over wired or wireless networks. The portable display 12 may implement one or more computer programs for performing some of the functions described herein and may communicate with the remote processor 14 and/or other various databases or processors via a wireless or wired communications network. The term "communicate," as used herein, may refer to one-way communication and/or two-way communication between various computing devices. Furthermore, the phrase "communicably coupled," as used herein, may refer to one-way and/or two-way communication between various computing devices.

The portable display 12 may comprise a graphical interface operable to display visual graphics, images, text, etc. in response to external or internal processes and commands. For example, the portable display 12 may comprise conventional black and white, monochrome, or color display elements including CRT, TFT, LCD, and/or LED display devices. The portable display 12 may be coupled with or integral with the remote processor 14 and may be operable to display various information corresponding to the aircraft component 20.

In some embodiments of the invention, the portable display 12 may comprise and/or be communicably coupled with a user interface. The user interface may comprise one or more functionable inputs such as buttons, switches, scroll wheels, a touch screen associated with the display, voice recognition elements such as a microphone, pointing devices such as mice, touchpads, tracking balls, styluses, cameras such as a digital still or video camera, combinations thereof, etc. For example, the portable display 12 may include or may be integrated with a touch screen display configured to enable a user to interact with the portable display 12 by touching or pointing at display areas to provide information or selections to the portable display 12 and/or the remote processor 14. Further, the user interface may comprise wired or wireless data transfer elements and/or ports such as a removable memory, data transceivers, etc., to enable the user and other devices or parties to communicate with the portable display 12. The user interface may also include a speaker for providing audible instructions and feedback. In some embodiments of the invention, the user interface of the portable display 12 may comprise a pointer (e.g., stylus). Specifically, a position and orientation of the pointer may be tracked, as later described herein, so that when a user points at a particular component of the aircraft component 20, information about that particular component is displayed on the graphical interface of the portable display 12.

The aircraft information displayed on the portable display 12 may include three-dimensional models, schematic drawings, part specifications, and other various information about the aircraft component 20. The models and other various information displayed on the portable display 12 may correspond with a location and orientation of the portable display 12 relative to the aircraft component 20.

The remote processor 14 may comprise any number and combination of controllers, circuits, integrated circuits, programmable logic devices such as programmable logic controllers (PLC) or motion programmable logic controllers (MPLC), computers, processors, microcontrollers, other electrical and computing devices, and/or other data and signal processing devices for carrying out the functions described herein, and may additionally comprise one or more memory storage devices, transmitters, receivers, and/or communication busses and ports. The remote processor 14 may be configured for one-way and/or two-way communication with the portable display 12 and/or the location and/or orientation-determining components 16,18. The remote processor 14 may be configured to communicate with the other components of the system 10 via wireless means, such as Wi-Fi or the like, or via wired means, such as via USB cables or the like.

In some embodiments of the invention, the remote processor 14 may comprise several separate processors or computing devices, such as a laptop communicating directly with the location and/or orientation-determining components 16,18 and a desktop computer or workstation communicating directly with the portable display 12. In this embodiment of the invention, the several processors or computing devices may communicate and exchange information with each other and may be located in remote locations relative to each other. Furthermore, the several processors or computing devices may each be configured to execute different steps, algorithms, subroutines, or codes described herein.

The remote processor 14 may be configured to implement any combination of the algorithms, subroutines, or code corresponding to method steps and functions described herein. The remote processor 14 and computer programs described herein are merely examples of computer equipment and programs that may be used to implement the present invention and may be replaced with or supplemented with other controllers and computer programs without departing from the scope of the present invention. While certain features are described as residing in the portable display 12 or the remote processor 14, the invention is not so limited, and those features may be implemented elsewhere. For example, databases accessed by the remote processor 14, such as aircraft component specification databases, may be located remotely from the remote processor 14 and/or the portable display 12 without departing from the scope of the invention.

In various embodiments of the invention, the remote processor 14 may implement a computer program and/or code segments to perform some of the functions described herein. The computer program may comprise an ordered listing of executable instructions for implementing logical functions in the remote processor 14 and/or the portable display 12. For example, the computer program may be a software program configured to run on a personal computer, laptop, tablet, or a mobile communications device. The computer program can be embodied in any computer-readable medium for use by or in connection with an instruction execution system, apparatus, or device, and execute the instructions. In the context of this application, a "computer-readable medium" can be any physical means that can contain, store, communicate, propagate, or transport the program for use by or in connection with the instruction execution system, apparatus, or device. The computer-readable medium can be, for example, but not limited to, an electronic, magnetic, optical, electro-magnetic, infrared, or semi-conductor system, apparatus, or device. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), a portable compact disk read-only memory (CDROM), an optical fiber, multi-media card (MMC), reduced-size multi-media card (RS MMC), secure digital (SD) cards such as microSD or miniSD, and a subscriber identity module (SIM) card.

As noted above, the remote processor 14 may comprise memory storage devices or other various memory elements. The memory may include one or more memory storage devices which may be integral with the remote processor 14, stand alone memory, or a combination of both. The memory may include, for example, removable and non removable memory elements such as RAM, ROM, flash, magnetic, optical, USB memory devices, MMC cards, RS MMC cards, SD cards such as microSD or miniSD, SIM cards, and/or other memory elements. Specifically, the memory may store at least a portion of the computer program or code segments described above, as well as user-specified preferences, information regarding user selections, aircraft component specifications, three-dimensional computer models of various aircraft components, calibration information regarding locations of one or more known features of the aircraft component 20, etc. Various known software programs, computer program languages, and applications may be stored in the memory of the remote processor 14 and/or accessed by the remote processor, such as CATIA, AutoCAD, Windows XP, RGS Sender, knowledge-based engineering (KBE) applications, and the like. The memory may also store information regarding aircraft components, including bill of material information, process codes, specification data, and the like.

The remote processor 14 may be configured to receive information regarding the location and/or orientation of the portable display 12 relative to the aircraft component 20, a geographic location of the portable display 12, or other information transmitted to the remote processor 14 by the portable display 12, the location and/or orientation-determining components 16,18, and/or various databases. Furthermore, the remote processor 14 may comprise a user interface such as a mouse, keyboard, touch screen, or various data input ports whereby the user may input data directly into the remote processor 14 or otherwise exchange information with the remote processor 14. The remote processor 14 may be configured to filter the information provided to the portable display 12 based on a current location and orientation of the portable display 12 relative to the aircraft component, a current geographic location of the portable display 12, user input, or other various user-selected or pre-programmed parameters.

The location and/or orientation-determining components 16,18 may include a GPS receiver, infrared cameras, an accelerometer, tilt sensor, inclinometer, or any other location-determining sensors or orientation-determining sensors. The location and/or orientation-determining components 16,18 may be configured to communicate with the remote processor 14 about the location and orientation of the portable display 12 relative to the aircraft component 20. The location and/or orientation-determining components may output information to allow the remote processor 14 to provide properly-oriented, properly-rotated, and properly-zoomed information and images to the portable display 12.

At least some of the location and/or orientation-determining components 16,18 may be independent of the portable display 12 and may be configured for tracking the portable display 12 with enough degrees of freedom and accuracy to provide geometric location and orientation information suitable for the uses described herein. For example, the location and/or orientation-determining components 16,18 may comprise one or more infrared cameras 16 for communicating with the remote processor 14 and a plurality of infrared targets or infrared markers 18. The infrared cameras 16 may include a plurality of infrared cameras (e.g., three infrared cameras) positioned at different locations and generally directed toward the aircraft component 20. The infrared cameras 16 may be configured to communicate with the remote processor 14. For example, the infrared cameras may be OptiTrack™ cameras manufactured by NaturalPoint® of Corvallis, Oreg., Raptor Series cameras manufactured by Motion Analysis Corporation of Santa Rosa, Calif., PPT Series Precision Position Tracking cameras manufactured by WorldViz LLC of Santa Barbara, Calif., or Bonita optical cameras manufactured by Vicon Motion Systems Inc. of Centennial, Colo.

The infrared markers 18 may be attached to the aircraft component 20 and/or the portable display 12. In some embodiments of the invention, the infrared markers 18 may additionally or alternatively be attached to the pointer of the portable display's user interface, described above, so that the location an orientation of the pointer relative to the aircraft component 20 may also be tracked. The infrared markers 18 may include active targets, such as infrared light emitting diodes (LEDs) or passive targets, such as retro-reflective spherical markers. In embodiments in which passive markers are used, the infrared cameras 16 may comprise infrared LEDs that bounce IR light off of the passive targets, such as reflectors or a reflective surface.

The infrared cameras 16 may be configured to be calibrated by placing a reference frame at a known location and orientation on the aircraft component 20. The reference frame may include one or more of the infrared markers 18. For example, the reference frame may be a framing square with three infrared markers thereon, and may be used by the remote processor 14 (receiving data from the infrared cameras 16) to establish a three-dimensional coordinate origin and axis system. Once calibrated, the coordinate data (e.g., x-axis, y-axis, z-axis, yaw, pitch, roll) for the portable display 12 may be calculated with respect to this coordinate origin and axis, as further described below.

In other alternative embodiments of the invention, the infrared cameras 16 and infrared markers 18 may be replaced with other technologies capable of tracking one object's orientation and location relative to a calibrated reference point. For example, location and/or orientation-determining components 16,18 may be radio frequency transmitters and receivers or laser transmitters and receivers. Additionally or alternatively, the location and/or orientation-determining components 16,18 may comprise accelerometers, gyroscopes, magnetic field sensors, geographic location-determining devices such as global positioning systems (GPS), and the like. In some embodiments of the invention, geographic location-determining devices may be included in the portable display 12 to supplement other location and/or orientation-determining components 16,18, such as the infrared cameras and markers 16,18. For example, the geographic location of the portable display 12 may be utilized by the remote processor 14 to filter the information provided to the portable display 12.

In general, the location and/or orientation-determining components 16,18 may be accurate enough to allow a user to distinguish between individual parts of the aircraft component 20. For example, to identify a single fastener part in a row of closely spaced fasteners, the portable display 12 or pointer may require accuracy within 10 mm, but to distinguish between brackets mounted on the structure, positional accuracy within 100 mm may be sufficient. The location and/or orientation-determining components 16,18 and the various configurations of the system 10 described herein may be tailored for specific applications depending on the accuracy required and the processing capabilities available for the portable display 12 and/or the remote processor 14.

In operation, the orientation and location of the portable display 12 relative to the aircraft component 20 is sensed via the location and/or orientation-determining components 16,18 and received by the remote processor 14 from the location and/or orientation-determining components 16,18. The sensed orientation and location is used by the remote processor 14 to determine an orientation, rotation, and amount of zoom to apply to a three-dimensional model of the aircraft component 20, and the remote processor 14 continually (or at regular frequent intervals) sends updated image views of the three-dimensional model to the portable display 12. For example, the portable display 12 may receive updated still images of the three-dimensional model so that the model viewed on the portable display 12 is at substantially the same orientation, rotation, and zoom as would be viewed by a camera if a camera was hypothetically mounted on the portable display 12. Advantageously, the system 10 of the present invention may provide these models and/or associated information embedded therein without the need of a camera attached to the portable display 12.

Figure 4:
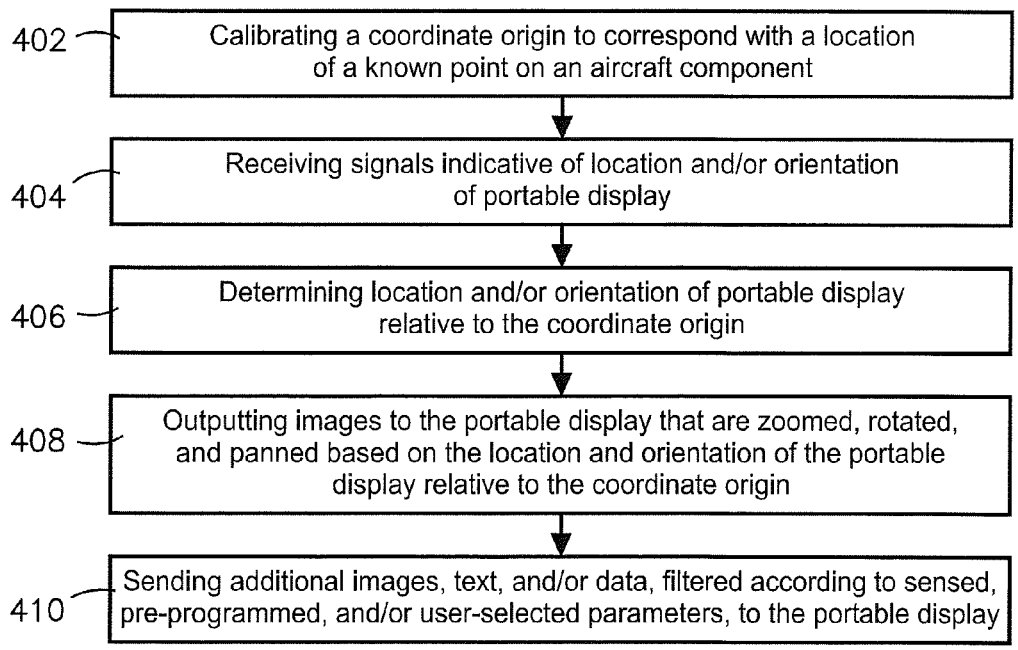
FIG. 4 is a flow diagram of a method for locating and displaying aircraft information in accordance with an embodiment of the present invention.

A flow chart of a method is illustrated in FIG. 4. The flow chart of FIG. 4 shows the functionality and operation of an exemplary implementation of the present invention in more detail. In this regard, some of the blocks of the flow chart may represent steps in a method 400 for sending location and orientation-based image views and information about the aircraft component 20 to the portable display 12. The blocks in the flow chart may also represent a module segment or portion of code of the computer programs of the present invention. The computer programs may comprise one or more executable instructions for implementing the specified logical function or functions. In some alternative implementations, the functions noted in the various blocks may occur out of the order depicted in FIG. 4. For example, two blocks shown in succession in FIG. 4 may in fact be executed substantially concurrently, or the blocks may sometimes be executed in the reverse order depending upon the functionality involved.

As illustrated in FIG. 4, the method 400 may comprise a step of calibrating a coordinate origin to correspond with a location of a known point on the aircraft component 20, as depicted in block 402. Specifically, remote processor 14 may associate the coordinate origin with a coordinate origin of a 3-dimensional model of the aircraft component 20. The location of the known point of the aircraft component 20 may be determined by the remote processor 14 via signals received from any of the location and/or orientation components 16,18 described above. For example, the location of the known point of the aircraft component 20 may be a location of an infrared marker on the known point of the aircraft component 20 relative to one or each of a plurality of infrared cameras.

The method 400 may further comprise a step of receiving signals indicative of location and/or orientation of the portable display 12, as depicted in block 404. For example, as described above, the infrared camera may track infrared markers on the portable display 12 and transmit this tracked information to the remote processor 14. In one example embodiment of the invention, the step depicted in block 404 may comprise at least three infrared cameras collecting infrared data from at least three infrared markers fixed to the portable display 12. Then the infrared cameras may each send signals to the remote processor 14 corresponding to the location of each of the infrared markers relative to each of the infrared cameras.

Furthermore, the method 400 may comprise the steps of determining a location and/or orientation of the portable display 12 relative to the coordinate origin, as depicted in block 406, and then outputting images to the portable display 12 that are zoomed, rotated, and/or panned based on the determined location and/or orientation of the portable display relative to the coordinate origin, as depicted in block 408. In some embodiments of the invention, the remote processor 14 may determine the orientation of the portable display 12 using geometric equations based on the locations, in a three-dimensional plane relative to the coordinate origin, of each of a plurality of the location and/or orientation components 16,18 attached to the portable display 12, such as the infrared markers, radio frequency emitters, or laser emitters described above.

The images output to the portable display 12 may be updated substantially continuously and/or at pre-determined intervals. Additionally or alternatively, the images output to the portable display 12 may be updated each time the remote processor 14 determines that the portable display 12 has moved or been re-oriented by a threshold amount. Specifically, the remote processor 14 may be configured to pan, rotate, and/or zoom a displayed image of a three-dimensional model file using three-dimensional model software, such as CATIA or AutoCAD. Then the remote processor 14 may save or capture this panned, rotated, and/or zoomed view in an image file, such as a PDF or JPEG file, and transmit the image file to the portable display 12.

Finally, in some embodiments of the invention, the method 400 may comprise a step of sending additional images, text, and/or data to the portable display 12, as depicted in block 410. The additional images, text, and/or data may be filtered according to sensed, pre-programmed, and/or user-selected parameters. For example, the remote processor 14 may determine specific information, instructions, or specifications to provide to the user via the portable display 12, such as an additional text or image file with instructions or product specifications needed for manufacturing, assembling, or repairing the aircraft component 20, depending on various filter parameters. Specifically, the aircraft information provide to the portable display 12 via the remote processor 14 may be filtered according to the location and orientation of the portable display 12 and/or a subject matter of interest or task selected by the user via the user interface of the portable display 12. In some embodiments of the invention, the information provided to the portable display 12 via the remote processor 14 may be filtered according to geographic location of the portable display 12 and/or a user's security clearance as provided to the portable display 12 and/or the remote processor 14. For example, the user may be required to enter a security code or provide other input to the portable display 12 and/or the remote processor 14 to indicate their level of security clearance to view particular trade secret or classified information or images. The user may be, for example, a mechanic assembling an aircraft or the aircraft component 20, an inspector performing aircraft quality audits, a mechanic performing maintenance procedures, or any other person requiring access to or creating aircraft information.

Although the invention has been described with reference to the preferred embodiment illustrated in the attached drawing figures, it is noted that equivalents may be employed and substitutions made herein without departing from the scope of the invention as recited in the claims. For example, some functions performed by the remote processor 14 may be alternatively performed by the portable display 12 without departing from the scope of the invention. Furthermore, in some alternative embodiments of the invention, some or all of the components of the remote processor 14 may be housed with and integral to the portable display 12. However, this embodiment of the invention may increase the weight of the portable display 12, which is not desirable in some applications. Additionally, some embodiments of the invention may completely omit the remote processor 14, and the portable display 12 may be configured to perform the functions of the remote processor 14, as described herein.

Having thus described various embodiments of the invention, what is claimed as new and desired to be protected by Letters Patent includes the following:

1. A system for displaying location or orientation-dependent images and information about an aircraft component, the system comprising:
   a portable display;
   at least one infrared marker, radio frequency emitter, or laser emitter fixed to the portable display;
   at least one infrared marker, radio frequency emitter, or laser emitter fixed to the aircraft component;
   at least one location and orientation-determining component comprising least one of an infrared camera, a radio frequency receiver, and a laser receiver and configured to detect locations of the infrared markers, radio frequency emitters, or laser emitters, and
   a remote processor comprising a computing device and a memory storage device having a computer program executable by the computing device stored thereon, the computer program comprising:
   a code segment for receiving a signal indicative of a location of a known point on the aircraft component and calibrating a coordinate origin to correspond with the location of the known point;
   a code segment for receiving information from the location and orientation-determining component,
   a code segment for determining a current location and orientation of the portable display relative to the coordinate origin based on the information received from the location and orientation-determining component; and
   a code segment for outputting images to the portable display in realtime, wherein the images are views of a 3-dimensional model of the aircraft component rotated, zoomed, and panned based on the current location and orientation of the portable display relative to the coordinate origin.

2. The system of claim 1, wherein the portable display does not comprise an image-capturing device.

3. The system of claim 1, wherein the location and orientation components further comprise at least one of a geographic-location determining receiver, an accelerometer, tilt sensor, and inclinometer.

4. The system of claim 1, wherein the information received from the location and orientation-determining component is filtered according to at least one of geographic location of the portable display and a user's security clearance received by at least one of the portable display and the remote processor.

5. A system for displaying location and orientation-dependent 3-dimensional model views, images, and information about an aircraft component, the system comprising:
   a portable display having a plurality of infrared markers, radio frequency emitters, or laser emitters fixed thereto;
   a plurality of location and orientation-determining components, wherein the location and orientation-determining components include at least one of an infrared camera, a radio frequency receiver, and a laser receiver configured to track locations of the plurality of infrared markers, radio frequency emitters, or laser emitters; and
   a remote processor that:
   receives signals output from the location and orientation-determining components,
   determines locations of each of the infrared markers, radio frequency emitters, or laser emitters in a three-dimensional plane based on the signals received from the location and orientation-determining components,
   determines a current orientation of the portable display using geometric equations based on the locations of each of the plurality of infrared markers, radio frequency emitters, or laser emitters in the three-dimensional plane, and sends signals to the portable display in realtime, wherein the signals sent to the portable display comprise images to be displayed on the portable display, wherein the images are views of a 3-dimensional model of the aircraft component rotated, zoomed, and panned by the remote processor based on a current location and orientation of the portable display relative to a coordinate origin associated with a known point on the aircraft component.

6. The system of claim 5, wherein the coordinate origin is associated with a coordinate origin of the 3-dimensional model of the aircraft component and the remote processor is calibrated to associate a determined location of the known point on the aircraft component with the coordinate origin.

7. A method for sending location and orientation-based image views and information about an aircraft component to a portable display, the method comprising:

receiving signals, with a remote processor, indicative of a location and orientation of the portable display from at least three infrared cameras collecting infrared data from at least three infrared markers fixed to the portable display;

determining, with the remote processor, a location and orientation of the portable display relative to a coordinate origin based on the signals received by the remote processor, wherein the remote processor is configured to associate the coordinates origin with a known point on the aircraft component; and outputting, with the remote processor, images to the portable display in realtime, wherein the images are views of a 3-dimensional model of the aircraft component rotated, zoomed, and panned based on the location and orientation of the portable display relative to the coordinate origin.

8. The method of claim 7, further comprising calibrating the coordinate origin to correspond to at least one of the infrared markers attached to the known point on the aircraft component.

9. The method of claim 7, wherein the coordinate origin is the coordinate origin of the 3-dimensional model of the aircraft component.

10. The method of claim 7, further comprising sending at least one of additional images, text, and data to the portable display filtered according to at least one of the location of the portable display, the orientation of the portable display, a particular task selected by a user of the portable display or the remote processor, and a security clearance of a user received by at least one of the portable display and the remote processor.

* * * * *